Sept. 4, 1962  C. W. GORDON ET AL  3,052,625
PRODUCTION OF COLOR-STABLE KEROSENE BY HYDROFINING
FOLLOWED BY HYPOCHLORITE TREATMENT
Filed Oct. 6, 1959

INVENTORS
CHARLES W. GORDON,
RICHARD S. MANNE,
BY MORRIS R. MORROW,

ATTORNEY

United States Patent Office 3,052,625
Patented Sept. 4, 1962

3,052,625
PRODUCTION OF COLOR-STABLE KEROSENE BY HYDROFINING FOLLOWED BY HYPOCHLORITE TREATMENT
Charles W. Gordon, Richard S. Manne, and Morris R. Morrow, Baytown, Tex., assignors, by mesne assignments, to Esso Research and Engineering Company, Elizabeth, N.J., a corporation of Delaware
Filed Oct. 6, 1959, Ser. No. 844,656
2 Claims. (Cl. 208—190)

The present invention is directed to a method for producing a color-stable kerosene by hypochlorite sweetening of the kerosene. In its more specific aspects, the invention is concerned with producing a color-stable kerosene by treating a kerosene fraction having a total mercaptan number less than 3 with an alkaline hypochlorite solution.

The present invention may be briefly described as a method for producing a color-stable kerosene in which a kerosene fraction containing mercaptans and having a total mercaptan number varying from about 1 to about 10 is monitored to ascretain the mercaptan content thereof. The monitored kerosene fraction is treated with alkaline hypochlorite solution when it has a total mercaptan number less than 3 and the monitored kerosene fraction is hydrofined in the presence of hydrogen and a hydrofining catalyst when it has a total mercaptan number greater than 3 to produce a hydrofined product having a total mercaptan number less than 3, which is then treated with alkaline hypochlorite solution.

The kerosene fraction forming the feed stock of the present invention is a kerosene distillate having a total mercaptan number varying from about 1 to about 10 and which is obtained by distilling a crude petroleum such as the so-called "sweet" crude petroleums encountered in the east and west central fields of Texas and in the Coastal crude oils.

The mercaptan number, as referred to throughout this specification, is the potentiometric mercaptan number obtained in accordance with the "Potentiometric Mercaptan Number Test" described by R. W. Tamele and L. B. Ryland in an article entitled "Potentiometric Determination of Mercaptans," (Industrial Engineering Chemistry, Analytical Edition, vol. 8, Nov. 16, 1936), and widely used throughout the industry.

In hydrofining the kerosene fraction, it is contacted with a suitable hydrofining catalyst, numerous examples of which are known to the skilled workman. Examples of suitable catalysts are oxides and sulfides of metals such as vanadium, chromium, manganese, iron, cobalt, nickel, molybdenum, tungsten, and the like as well as oxides of platinum and palladium. Specific examples of such catalysts are cobalt molybdate, nickel-tungsten sulfide, cobalt sulfide, molybdenum oxide, nickel sulfide, tin sulfide, and the like. The catalysts are preferably employed in particulate form supported on a suitable carrier such as alumina, magnesia, silica, zinc oxide, and kieselguhr, which may or may not, as desired, contain silica. The catalyst may be employed in the form of a fixed bed catalyst, in the form of a fluidized bed, as a suspension or in any other manner well known to those skilled in the art.

In the hydrofining operation, the kerosene having a total mercaptan number greater than 3 is hydrofined in the presence of hydrogen in an amount ranging from about 100 to about 2000 standard cubic feet of hydrogen per barrel of kerosene. A preferred amount may range from about 200 to about 750 cubic feet of hydrogen per barrel of kerosene.

The hydrogen may be hydrogen-containing gases or may be pure hydrogen; preferably the hydrogen is a hydrogen-containing gas.

The reaction conditions in hydrofining the kerosene fraction having a mercaptan number greater than 3 include a temperature within the range of about 500° to about 750° F., a space velocity in the range from about 1 to about 16 volumes of feed per volume of catalyst per hour and a reactor pressure within the range of about 50 to about 600 pounds per square inch gauge. In a preferred form of the invention, a temperature of about 500° to about 700° F., a space velocity of about 2 to about 6 v./v./hour and a pressure of about 100 to about 500 pounds per square inch gauge are employed. Pressure and hydrogen charge rate may be correlated to provide a hydrogen partial pressure in the reaction zone within the range of about 50 to about 150 pounds per square inch absolute.

The hypochlorite solution is preferably sodium hypochlorite although other hypochlorite solutions may be used such as calcium hypochlorite, lithium hypochlorite, and potassium hypochlorite solution. In the preferred form of the invention, the sodium hypochlorite solution may have a free alkalinity in the range between about 50 and about 250 grams of free sodium hydroxide per liter of solution. The available chlorine content of hypochlorite-treating solution may suitably be in the range from about 1 to about 100 grams per liter.

The hypochlorite treating step of the present invention may be conducted ordinarily at temperatures ranging from about 60° F. up to about 120° F. with temperatures within the range from about 75° F. to about 100° F. being preferred. However, higher temperatures up to about 250° F. may be used under some conditions. When higher temperatures are used, it may be desirable to superimpose pressure on the treating equipment.

The present invention will be further illustrated by reference to the drawing in which:

FIG. 1 is a flow diagram of a preferred mode;

FIG. 2 is an enlarged view of the mercaptan number monitor used in FIG. 1; and

FIG. 3 is another arrangement of the monitor of FIGS. 1 and 2.

Referring now to FIG. 1, numeral 11 designates a charge line in which a kerosene feed stock having a total mercaptan number varying from about 1 to about 10 is introduced continuously into a mercaptan number monitor 12 which, as described in the Tamele and Ryland article supra, may be used to monitor continuously the mercaptan number of kerosene feed. While the mercaptan number of the kerosene feed may be continuously monitored, it may be monitored intermittently and the feed stock routed to the particular treating step by manual operation of the valves. The monitored kerosene from the monitor 12 is flowed through line 13 containing a control valve 14 which is opened by an electrical impulse through an electrical lead 15 leading to the monitor 12. The kerosene in line 13 is then introduced into a mixing zone 16, which is illustrated by a baffle type plate incorporator but which may be an agitating means with a stirrer, a cascade type tower, a bell cap tower, or any other of the numerous mixing means available on the market. In mixing zone 16 the kerosene feed is mixed intimately with hypochlorite solution which is introduced by line 17 from a source, to be described hereinafter, which causes treating of the kerosene fraction to produce a sweet product which is recovered by introducing the mixture from zone 16 into a settling zone 18 by line 19. Settling zone 18 is of sufficient size to provide a residence of sufficient duration to allow separation of the treated kerosene from the hypochlorite solution, the treated kerosene being recovered as a color-stable product by line 20 and thereby discharged into storage, not shown. The product from zone 18 may suitably be water washed as desired.

The separated hypochlorite solution is withdrawn by line 21 and a major part or all thereof recycled by line 22 containing pump 23 into line 17 for admixture with monitored kerosene in line 13. From time to time a portion of the hypochlorite solution is discarded by opening valve 24 in line 21. When this occurs, fresh hypochlorite solution is introduced into line 17 from line 25 by opening valve 26 connecting into a chlorinating vessel 27 wherein fresh sodium hydroxide solution is introduced by line 28 and chlorine by line 29. This forms fresh hypochlorite solution for introduction into line 17 by line 25. Chlorinating vessel 27 is equipped with a cooling coil 30 and a vent line 31.

When monitor 12 registers a total mercaptan number greater than 3, valve 14 in line 13 is closed and valve 32 in line 33 is opened, valve 32 being connected by an electrical lead 34 to monitor 12. When the mercaptan number of the kerosene feed is greater than 3, the feed is preferably discharged into a hydrofining zone 35 containing a catalyst of the nature described and into which hydrogen is introduced by line 36. It is to be understood, however, that it may be desirable to divert part or all of the stream in line 32 to heating oil, jet fuel, or for other purposes by opening valve 32a in line 32, valve 32b being closed. While hydrofining zone 35 is shown schematically, it is understood to include all auxiliary equipment usually associated with a modern hydrofining operation. Conditions are adjusted in hydrofining zone 35 to produce a product having a mercaptan number less than 3 which is discharged from zone 35 by line 37 and preferably is recycled by line 38 controlled by valve 39 to line 13 for admixture with hypochlorite solution introduced by line 17. A portion or all of the hydrofined product may be discharged from zone 35 by manipulating valve 39 and opening valve 40 in line 37.

Referring now to FIG. 2 in which identical numerals designate identical parts, the kerosene feed is introduced by way of line 11 into the system from a source, not shown, and is flowed by way of line 13 through valve 14 into mixing zone 16 after admixing with hypochlorite solution, as shown in FIG. 1.

A portion of the kerosene feed in line 11 is introduced into mercaptan number monitor 12 by way of line 41, controlled by valve 42 and the discharge from the monitor 12 may be introduced back into line 13 by way of line 43 controlled by valve 44. Mercaptan number monitor 12 is constructed as described in the article by Tamele and Ryland supra and provides an electrical impulse through lead 15 which opens valve 14 when the mercaptan number of the stream is less than 3 and closes valve 14 when the mercaptan number is greater than 3; valve 32 is opened by receiving an impulse through lead 34 to route the kerosene feed having a mercaptan greater than 3 to hydrofining zone 35, as described with reference to FIG. 1. Suitably, valves 14 and 32 may be replaced by a single three-way valve with lines 13 and 33 connecting thereto. When this is done, variation in mercaptan number conducts the feed either to the hypochlorite sweetening step or to the hydrofining step as shown in FIG. 3.

Referring now to FIG. 3, the mercaptan number monitor 12 is connected to lines 11 and 13 by branch lines 41 and 43 containing valves 42 and 44, respectively.

Arranged in line 13 is a three-way valve 45 which is operatively connected by electrical lead 46 to motor 47 which, in turn, is operatively connected by lead 48 to monitor 12. When the total mercaptan number of the kerosene in line 11 is less than 3.0, valve 45 is in the position shown in FIG. 3 whereas when the total mercaptan number is greater than 3.0, the valve 45 is rotated to close line 13 and open line 33 into communication with line 11. It is understood that mercaptan number monitor 12 will incorporate all necessary and essential features as described in the Tamele and Ryland article supra.

It will be seen from the foregoing description taken with the drawing that a method has been provided for hydrofining kerosene fractions to produce a color stable product.

The present invention is of commercial utility and importance in that it has been noted in the commercial sweetening of kerosene distillates employing sodium hypochlorite solution, periodic difficulties have been experienced with color stability of the finished stocks during shipping or storage. An investigation of the feed stock characteristics showed that the mercaptan level of the kerosene feed correlated with color stability. This is shown by the data in Table I in which three synthetic mercaptan mixtures were prepared containing, respectively, primary, secondary, and tertiary mercaptans.

*Table I*

| Kerosene Feed: | | | |
|---|---|---|---|
| Mercaptan Type_ | Primary_____ | Secondary_____ | Tertiary. |
| Mercaptan Number. | 13.6_____ | 8.0_____ | 13.4. |
| Mercaptans Used_ | $C_3, C_4, C_5, C_6,$ $C_8, C_{10}.$ | $C_3, C_4, C_5$_____ | $C_4, C_5, C_6, C_7,$ $C_{10}.$ |
| Sweetened Product: | | | |
| Color, Saybolt____ | +28_____ | +28_____ | +25. |
| Color, Saybolt, after 16 Hours at 212° F. | +25_____ | +27_____ | −16. |

These results show that tertiary mercaptans are the offenders insofar as color instability is concerned.

Thereafter, further runs were made in which feed stocks containing tertiary mercaptans in various concentrations were made up and subjected to sweetening with sodium hypochlorite solution. These data are presented in Table II.

*Table II*

| Kerosene Feed: | | | | | |
|---|---|---|---|---|---|
| Mercaptan Number_____ | 0.4 | 0.8 | 1.3 | 2.3 | 3.2 |
| Mercaptan Type_____ | (¹) | (¹) | (¹) | (¹) | (¹) |
| Saybolt Color_____ | +30 | +28 | +28 | +29 | +28 |
| 16-Hour Saybolt Color___ | +25 | +26 | +27 | +22 | +24 |
| Product (Dr. Pass): | | | | | |
| Mercaptan Number_____ | ------ | 0.7 | 0.9 | 1.7 | 2.4 |
| Saybolt Color_____ | ------ | +28 | +27 | +27 | +27 |
| 16-Hour Saybolt Color___ | ------ | +26 | +21 | +8 | −3 |

¹ Tertiary.

The results in Table II show that if the kerosene contains in excess of 1.3 tertiary mercaptan number, a sweet product by alkaline hypochlorite treating, which has a 16-hour color stability in excess of about 20, cannot be made. By way of explanation, a sweetened product which has a 16-hour color stability in excess of 20 is an indication of storage stability. It has also been determined that kerosene fractions having a 16-hour color stability less than 20 are not marketable.

The mercaptan number or content of kerosene distillates produced from crude oils generally considered "sweet" varies erratically, depending on the composition of the mixture. In order to show the variation in mercaptan number, daily tests were made over an extended period of time of kerosene distillate being obtained at a large Texas refinery from a so-called "sweet" crude mixture. These data are presented in Table III, which shows that the mercaptan number may vary from 2.4 up to about 6.9.

Table III

| Day: | Mercaptan number |
|---|---|
| 1 | 3.8 |
| 2 | 4.8 |
| 3 | 3.6 |
| 4 | 4.6 |
| 5 | 5.6 |
| 6 | 5.9 |
| 7 | 5.9 |
| 8 | 6.9 |
| 9 | 5.2 |
| 10 | 2.7 |
| 11 | 3.3 |
| 12 | 3.5 |
| 13 | 3.9 |
| 14 | 3.0 |
| 15 | 2.4 |
| 16 | 6.4 |
| 17 | 6.8 |

In accordance with the present invention, kerosenes having a total mercaptan number less than 3 may be sweetened using alkaline hypochlorite solution to produce a color stable product.

While those having a total mercaptan number greater than 3 may not be sweetened with hypochlorite solution to produce a color stable product, in accordance with the present invention the kerosene fraction having a total mercaptan number greater than 3 is hydrofined under hydrofining conditions to produce a product having a total mercaptan number less than 3. This product is amenable to sweetening using an alkaline hypochlorite solution to produce a color-stable product.

The present invention has been used over a period of months to produce a color-stable product by alkaline hypochlorite treating of the kerosene having a total mercaptan number less than 3. The invention is therefore of commercial advantage and utility.

The nature and objects of the present invention having been completely described and illustrated, what we wish to claim as new and useful and secure by Letters Patent is:

1. A method of treating a kerosene fraction having a total mercaptan number greater than 3.0 to produce a color-stable kerosene product which comprises hydrofining said fraction at a temperature within the range of about 500° F. to about 750° F. and at a pressure within the range from about 50 to about 6000 pounds per square inch gauge to produce a hydrofined product having a total mercaptan number less than 3.0, and contacting said hydrofined product with alkaline hypochlorite solution, whereby a color-stable kerosene product is produced.

2. A method of treating a kerosene fraction having a tertiary mercaptan number greater than 1.3 to produce a color-stable kerosene product which comprises hydrofining said fraction at a temperature within the range of about 500° F. to about 750° F. and at a pressure within the range from about 50 to about 600 pounds per square inch gauge to produce a hydrofined product having a tertiary mercaptan number less than 1.3 and contacting said hydrofined product with alkaline hypochlorite solution, whereby a color-stable kerosene product is produced.

References Cited in the file of this patent

UNITED STATES PATENTS

| | | |
|---|---|---|
| 1,435,824 | Dunstan | Nov. 14, 1922 |
| 2,013,083 | Welsh | Sept. 3, 1935 |
| 2,626,232 | Love | Jan. 20, 1953 |
| 2,757,127 | Porter et al. | July 31, 1956 |
| 2,773,009 | Earhart et al. | Dec. 4, 1956 |
| 2,773,019 | Waddell | Dec. 4, 1956 |
| 2,865,850 | Holcomb et al. | Dec. 23, 1958 |
| 2,866,746 | Love | Dec. 30, 1958 |